United States Patent [19]

Jurschak

[11] 3,847,020

[45] Nov. 12, 1974

[54] FLOW METER

[76] Inventor: John Jurschak, 825 Casozza Dr., Reno, Nev. 89502

[22] Filed: Jan. 26, 1973

[21] Appl. No.: 327,079

[52] U.S. Cl.................................. 73/228, 73/205
[51] Int. Cl................................................ G01f 1/00
[58] Field of Search... 73/194 E, 205 R, 228, 141 R

[56] References Cited
UNITED STATES PATENTS

| | | | |
|---|---|---|---|
| 2,364,930 | 12/1944 | Turner | 73/205 R |
| 2,769,337 | 11/1956 | Rich | 73/206 |
| 3,081,629 | 3/1963 | Clauss et al. | 73/228 X |
| 3,104,549 | 9/1963 | Humbert et al. | 73/228 |
| 3,164,018 | 1/1965 | Bennett | 73/228 |

*Primary Examiner*—Charles A. Ruehl

[57] ABSTRACT

A solenoid type armature of high magnetic permeability is reciprocably translatable within an elongated flow chamber in a housing interposed in a conduit carrying a flow of non-magnetic fluid, or of non-magnetic powdered or granular material. Electronic cycle control and measurement circuitry is connected to inductive coils encircling the armature. By cyclically energizing the solenoid coil, a periodic force of known amount is imposed on the armature in a predetermined direction with respect to the dynamic force of the flow stream acting on the armature. The resultant reciprocating armature movement is sensed, measured, transformed and then read out in terms of flow rate.

11 Claims, 12 Drawing Figures

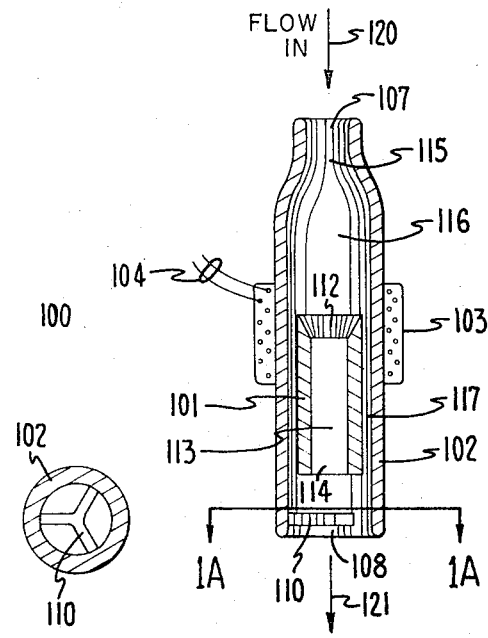
Fig-1A
Fig-1
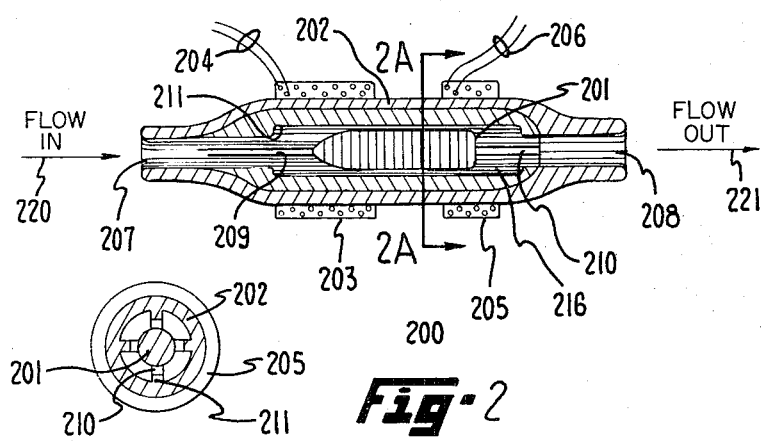
Fig-2A
Fig-2

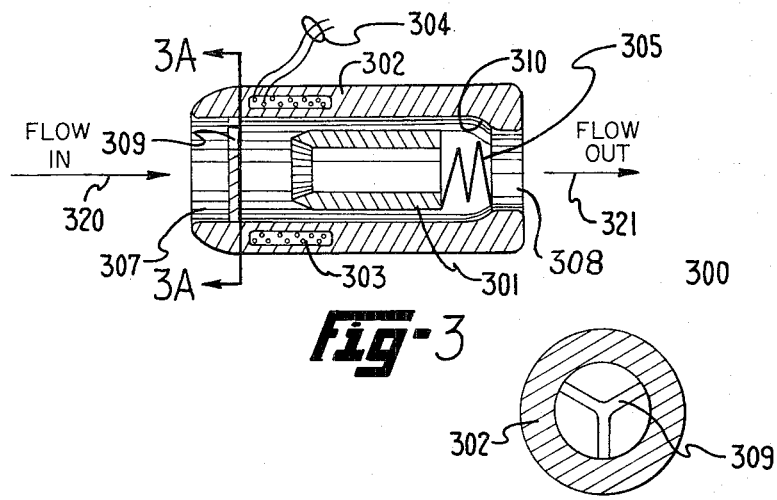
Fig-3
Fig-3A
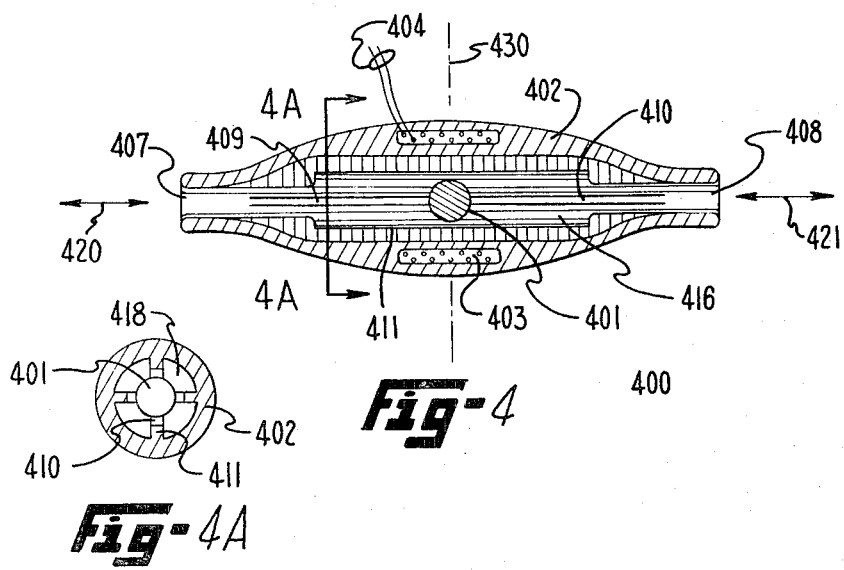
Fig-4
Fig-4A

FLOW METER

BACKGROUND OF THE INVENTION

1. Field of the Invention

This invention relates to an improved flow meter for measuring the flow rate of fluids, either liquid or gas, or of powdered and granular materials.

2. Prior Art Relating to the Disclosure

Flow measurements have generally been carried out by devices employing closely fitted rotating metal parts, such as turbine vanes, or by devices using fixed orifice plates, interposed in the flow stream.

The former type of mechanism is subject to friction, rapid wear and corrosion (especially when the flow stream is chemically corrosive or is a substance with entrained solids, such as raw crude oil laden with sand) making it subject to malfunction and requiring periodic upkeep and repair. Exemplary of the rotating vane type of flowmeter are the disclosures in Jennings U.S. Pat. No. 3,714,310 and Bauer et al, U.S. Pat. No. 3,555,900.

The differential pressure type, wherein pressure drop across an orifice in a plate is a measure of the flow rate, is particularly susceptible to clogging of the pressure monitoring lines where solid, particulate matter is entrained in the flow stream.

Still other types of flowmeters are the linear momentum mass flow rate meter as disclosed, for example, in Miller U.S. Pat. No. 3,608,374, which measures drag torques produced on an oscillatory impact plate positioned in the flow stream; and the well known "fluid flow switch" which indicates whether a "flow" or "no-flow" condition exists. In both of these types, the plate structure situated in the fluid stream is attached to a pivot shaft extending through the conduit wall, thus necessitating substantial seals and attendant structure with their consequential disadvantages.

SUMMARY OF THE INVENTION

This invention relates to a flow meter system comprising a streamlined electromechanical transducer, so positioned in a flow stream that it minimally impedes flow, and associated external electronic control and measurement circuitry.

It is an object of the invention to provide a flow meter system which is devoid of journal bearings, pressure monitoring lines, isolating diaphragms and shaft seals.

It is another object of the invention to provide a flow meter system which is not only reliable but is also rugged, durable and long-lived even in a stream of corrosive material, such as chemicals, or when measuring the flow of raw crude oil with entrained sand and water, for example.

It is still another object of the invention to provide a flow meter which is relatively economical both as to initial acquisition and installation cost and to maintenance and upkeep expense.

It is a further object of the invention to provide a flow meter which has but a minimum number of parts to get out of order, and which requires but a small opening in the conduit wall so as to accommodate a small number of electrical wire conductors.

It is still a further object of the invention to provide a flow meter which is readily installed in existing pipeline facilities, even of the large volume type.

It is another object of the invention to provide a generally improved flow meter system.

Other objects, together with the foregoing, are attained in the embodiments described in the following description and illustrated in the accompanying drawings.

BRIEF DESCRIPTION OF THE DRAWINGS

FIG. 1 is a median longitudinal sectional view of a gravity biased unidirectional form of transducer;

FIG. 1A is a transverse sectional view taken on the line 1A—1A in FIG. 1;

FIG. 2 is a median longitudinal section of an electromagnetically biased unidirectional form of transducer;

FIG. 2A is a transverse sectional view taken on the line 2A—2A in FIG. 2;

FIG. 3 is a median longitudinal section of a spring biased unidirectional form of transducer;

FIG. 3A is a transverse sectional view taken on the line 3A—3A in FIG. 3;

FIG. 4 is a median longitudinal section of a bidirectional form of transducer;

FIG. 4A is a transverse sectional view taken on the line 4A—4A in FIG. 4;

DETAILED DESCRIPTION OF THE INVENTION

Figure 5:
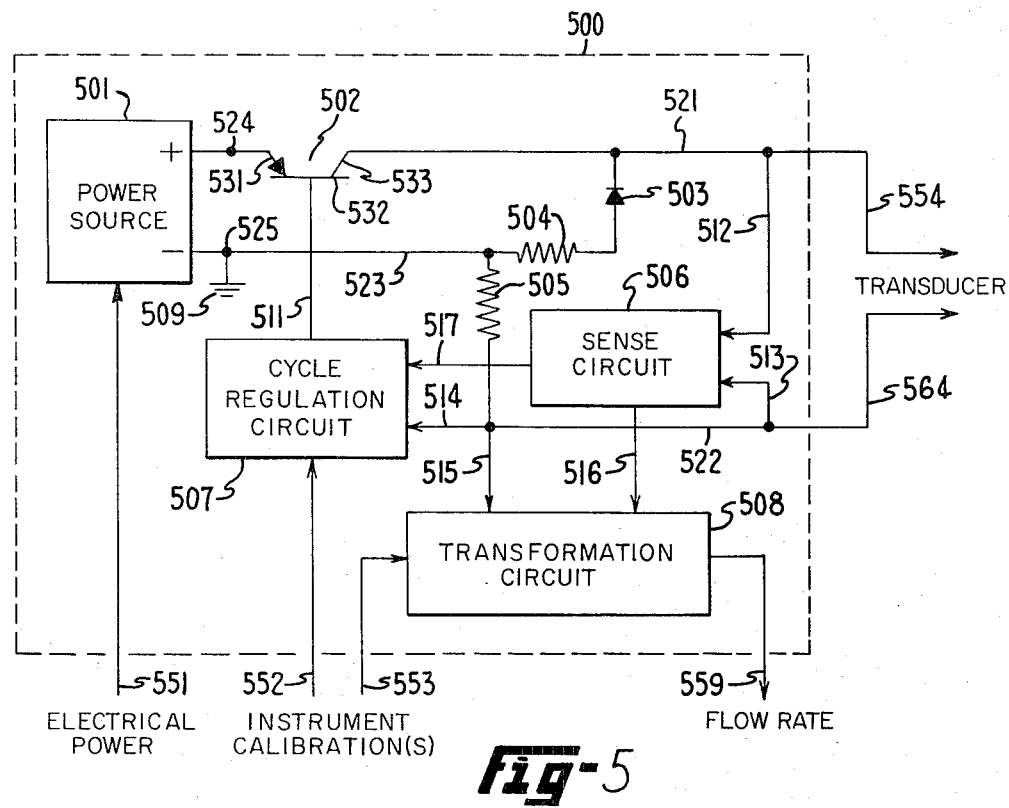
FIG. 5 is a functional diagram of the overall electronic circuitry.

While the flowmeter of the invention is susceptible of numerous physical embodiments, depending upon the environment and requirements of use, the transducer forms disclosed herein represent four preferred embodiments.

The form shown in FIGS. 1 and 1A comprises a gravity biased transducer, generally designated by the reference numeral 100, including a vertically elongated housing 102 constructed of a material having a relatively low magnetic permeability. The housing walls define an elongated cylindrical chamber 116 within which is translatably disposed a hollow elongated armature 101 of ferromagnetic material highly responsive to the magnetic field selectively impressed upon it by the windings of a solenoidal coil 103 connected by conductors 104 to the appropriate circuitry of FIG. 5 as will subsequently be explained.

The solenoid type armature 101 is generally tubular in shape and includes an upwardly diverging, tapered inlet port 112, a central channel 113 and an outlet port 114.

Upward movement of the armature 101 is limited by an annular neck defining a constricted throat 115 opening at its upper end in a mouth 107, or intake orifice. Downward movement of the armature 101, on the other hand, is halted by a transverse triskelion spider 110, or three-legged member, mounted adjacent the lower end of the housing; the aftermost position will be subsequently referred to as that of armature "disengagement." The spider 110 is held in place as by weldments, or by suitable fastenings, such as set-screws.

Below the spider 110, the central housing chamber 116 terminates in a discharge orifice 108.

The direction of motion of the flow to be measured is indicated by the axial arrows 120–121. In other words, flow enters the transducer at the mouth 107 as indicated by the arrow 120, then traverses the throat 115 and emerges into the enlarged central chamber 116. At this juncture, the major portion of the stream flows through the downwardly converging inlet port 112 of the armature, thence downwardly through the armature's central channel 113 and outlet port 114, thence through the openings in the spider 110 and, finally, through the discharge orifice 108, as indicated by the arrow 121.

A smaller portion of the flow finds its way down the annular passageway 117 between the armature 101 and the circumjacent walls of the housing 102. In the passageway, the flow is laminar in nature; when relative motion occurs, substantially all frictional force on the armature is viscous friction due to the flow stream.

The stream of material can be a fluid or it can be of a powdered or granular consistency, or a combination of both, such as would be the case with a slurry; or it can be a fluid with solid impurities, such as oil with sand entrained therein, for example.

An important requirement of the stream flow material is that it exhibit a relatively small amount of magnetic permeability compared with that of the armature. In other words, the armature's response to the electromagnetic field exerted by the solenoid coil 103 must not be unduly distorted as a consequence of magnetic reaction between the electromagnetic field and the material forming the flow being measured.

As appears most clearly in FIG. 1, not only the dynamic force exerted by the downward stream flow in the direction indicated by the arrows 120–121 against the armature 101 but also the force of gravity tends to urge the armature 101 downwardly until halted by the spider 110.

If, however, adequate electrical energy is applied through the conductors 104 to the windings 103, a magnetic field will be established which will cause the armature 101 to translate upwardly. In other words, by creating magnetic field of sufficient strength, the combined downward forces of gravity and dynamic fluid flow are overcome by the upward force of the magnetic field; and the armature will rise until the upward solenoidal force on the armature reduces to that of the combined dynamic flow and gravitational forces. In this uppermost location, the armature is substantially in position to receive the maximum flux realizable by the magnetic field; this forwardmost position will be subsequently referred to as the armature's "engaged" position.

Thereafter, should the electrical power be interrupted, the magnetic field will collapse and the downward urgency of fluid flow and gravity will resume control, causing the armature to translate downwardly into abutment with the spider 110.

The foregoing characteristics are utilized in measuring the rate of flow through a conduit, such as a pipe carrying a chemical product, for example.

The transverse sectional dimensions of the transducer 100 can range from greater than to less than those of the conduit carrying the flow to be measured. If, for example, the flow rate in a quarter inch tube is to be monitored, a transducer somewhat larger in transverse size than the tube can be interposed in the tube, with smoothly merging transition portions connecting the ends of the transducer to the respective ends of the tube.

Conversely, if flow rate in a 36 inch oil pipeline is to be measured, the transducer can be suitably positioned inside the pipe, if desired, even though the transverse diameter of the transducer is considerably less than 36 inches. It is to be noted, in this connection, that most accurate results are attained by installing a plurality of transducers at various locations on a transverse plane of the pipe and obtaining a composite flow measurement from all of the transducers.

With the transducer suitably installed so that stream flow occurs in the direction of the arrows 120–121, the coil 103 is alternately energized and de-energized in a timed sequence such that reciprocation of the solenoidal armature 101 occurs in a predetermined cyclical manner related to the flow, as will now be explained.

Reference is first had to FIG. 5, a general combined functional block and circuit diagram. The electronic circuit portion 500 of the diagram includes an external electrical power input 551 to an internal DC power source 501 where the input (typically 115 VAC, 50/60 Hz) is suitably converted so as to provide the desired voltage and polarity at a positive terminal 524 and a negative terminal 525 "grounded" as at 509.

A series diode 503 and resistor 504 is connected in shunt between ground junction 523 and a junction 521 which connects to one of the transducer's solenoidal coil terminals 554. Also, a resistor 505 is connected in series between ground junction 523 and a junction 522 which connects to the transducer's other solenoidal coil terminal 564.

The node 522 connects to a conductor 513 attached to a sense circuit 506; the other sense circuit 506 input is provided through a conductor 512 connected to node 521. A conductor 514 from the nodes 522 is also connected to the cycle regulation circuit 507. The node 522 is also connected by a conductor 515 to a transformation circuit 508.

Lines 516 and 517 respectively deliver sense circuit 506 outputs to cycle regulation circuit 507 and transformation circuit 508.

The cycle regulation circuit 507, in turn, is connected by a conductor 511 to the base 532 of a PNP transistor 502, the collector 533 being connected, as shown, to the node 521, while the emitter 531 is attached to the positive terminal 524 of the power source 501.

Optional instrument calibration leads 552 and 553 extend to the cycle regulation circuit 507 and the transformation circuit 508, respectively.

Figure 6:
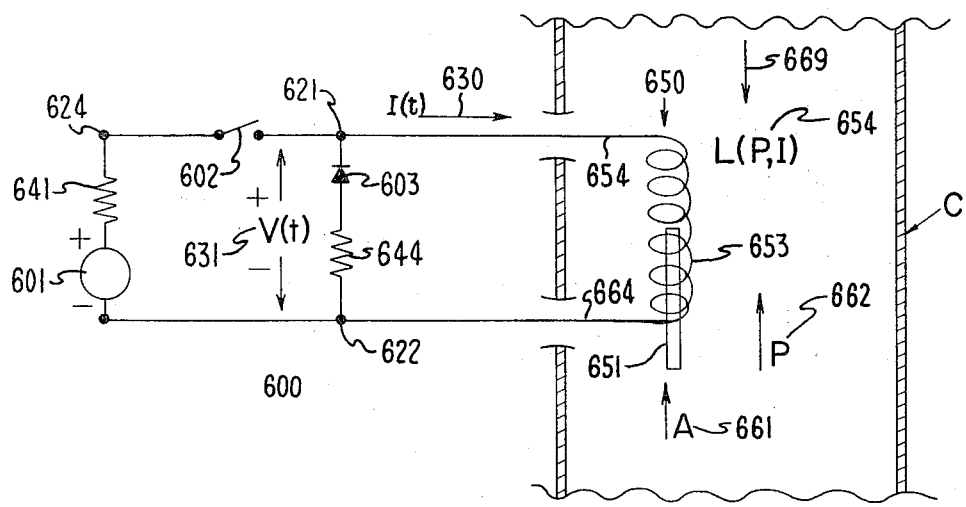
FIG. 6 is a schematic diagram of the transducer and attendant circuitry.

As appears most clearly in FIG. 5, the flow meter's electronic circuitry 500, through leads 554 and 564, alternately energizes and deenergizes the transducer's solenoid coil 653 (see FIG. 6). During this cycle, the transistor 502 acts in the nature of an electronic switch. The transistor 502, in other words, is saturated (in effect, a short circuit from the emitter 531 to the collector 533) when the transducer 650 is being energized, and is cut off (in effect an open circuit) when the transducer is being deenergized.

The diode 503 also acts in the nature of a switch; and is an effective open circuit when the transducer 650 is being energized whereas the diode 503 conducts when the transducer 650 is being deenergized, flow then occurring through the deenergization network indicated by the resistor 504.

It is to be noted at this time that the circuit generally designated by the reference numeral 600 of FIG. 6 schematically represents and corresponds to the circuit portion 500 of FIG. 5 described immediately above. That is to say, the transistor 502 of FIG. 5 is replaced by an equivalent "open or close" switch 602 of FIG. 6. Similarly, the diode 503 of FIG. 5 is represented by the diode 603 of FIG. 6.

It is also to be noted that the stylized apparatus represented by reference number 650 of FIG. 6 schematically represents and corresponds to the invention's transducer already described.

The input 513 to the sense circuit 506, and the respective inputs 514 and 515 from the node 522 to the cycle regulation circuit 507 and the transformation circuit 508 afford suitably high impedance so that the resistor 505 current is substantially that of the transducer's solenoid coil 653. Thus, the voltage at the node 522 with respect to "ground" 509 is a measure of the solenoid coil current.

The resistor 505 current and, hence, the transducer solenoid coil 653 current, is routed through the transistor 502 when the transistor is saturated (short circuit from emitter 531 to collector 533); and through the diode 503 when the transistor 502 is cut off. It is to be noted that the series resistor 505 is a preferred, although not the only, circuit technique which can be used to obtain a measure of the solenoid coil current.

Since the input conductors 512 and 513 to the sense circuit 506 bridge the transducer coil terminals 554 and 564, respectively, they deliver substantially the transducer coil voltage, and particularly the transient component thereof, to the sense circuit 506.

As will be understood, the reciprocating motion of the transducer armature causes coil voltage fluctuations and the sense circuit 506 serves to detect such voltage fluctuations.

The sense circuit 506 is typically comprises of any conventional type of AC-coupled, high input impedance, differential amplifier circuit, followed by appropriate pulse-shaping circuitry, the outputs of which are delivered to the cycle regulation circuit 507 via the line 517, and the transformation circuit 508 via the line 516.

The cycle regulation circuit 507 produces a periodic, bilevel, time-base voltage which, in general, alternately saturates and cuts off the transistor 502. The cycle regulation circuit 507 receives its principle input from the sense circuit 506, via the line 517, but it also has an optional solenoid coil current input, via the conductor 514 extending from the node 522, and a calibration input 552, as previously explained.

The cyclic rate of the output voltage of the cycle regulation circuit 507, and hence that of the transducer's reciprocating armature, will hereinafter be referred to as the "sampling rate."

The sense circuit 506 and the cycle regulation circuit 507 comprise the "control circuitry" of the invention's electronic circuit 500.

A measure of the solenoid coil current enters the transformation circuit 508 via the conductor 515 from the node 522; and the line 516, as previously explained, also delivers an output from the sense circuit 506 to the transformation circuit 508. In the transformation circuit 508, these two inputs are converted, by conventional techniques well known in the art, into any suitable form of flow rate, the line 559 extending to the particular read out device to be used. The transformation circuit 508 will be subsequently described in more detail.

The resistor 505 (i.e. the transducer coil current measuring means), together with the sense circuit 506 and the transformation circuit 508 comprise the "measurement circuitry" of the invention" of the invention's overall electronic circuitry 500.

Reference is now had to FIG. 6, which discloses a circuit 600 which is a substantial equivalent of the electronic circuitry portion 500 of FIG. 5. In other words, voltage source 601 in FIG. 6 corresponds to the internal power source 501 of FIG. 5. The resistor 641 represents the internal impedance (501, 505) of the circuit 500 at its transducer terminals 554 and 564 when in the energize state; and resistor 644 in the shunt represents the internal impedance (504, 505) when in the deenergize state.

The nodes 621 and 622 correspond to nodes 521 and 522; and the node 624 corresponds to the node 524.

Switch 602 in the open position shown in FIG. 6 corresponds to the transistor 502 in an open circuit, or deenergize, condition, and diode 603 is the counterpart of diode 503.

The conductors 654 and 664 correspond to respective leads 554 and 564 connected to the transducer's solenoid coil, whether it be the stylized coil 653 shown in FIG. 6, or the coil 103 in FIG. 1, or the coils 203, 303 or 403 of the transducers depicted, respectively, in FIGS. 2, 3 and 4.

In FIG. 6, the coil leads 654 and 664 are shown as piercing the wall of a flow conduit C within which the transducer assembly 650 is positioned in alignment with the direction of the downward stream flow indicated by the arrow 669. In practice, both wires 654 and 664 would be relatively small in size and located in cable of small diameter so that a tight, permanent, trouble-free seal can readily be provided where the cable passes through the conduit wall.

The solenoid coil current 630 is also designated, for convenience, as I ($t$), and the transducer coil voltage 631 by the symbol V ($t$). The designation L (P,I), reference numeral 654, emphasizes that the inductance L of the transducer coil 653 is principally a function of armature position P ($t$), numeral 662, and also related to coil current I ($t$) 630.

The letter A, reference numeral 661, represents the net force acting on the transducer armature 651. The upward direction of the arrows, or force vectors A661, and armature position P ($t$) 662 is opposite to that of the downward flow stream direction 669 in FIG. 6, and the upward direction is arbitrarily assumed as a mathematical positive direction.

The following equations mathematically express the operation of the device.

The net force A exerted on the armature 651 is given by the expression:

$$A = S - (F \pm B) \qquad (1)$$

where $$F \pm B > 0 \tag{2}$$

for proper flow meter operation where S, F and B are all ≥ 0.

S represents the solenoid, or magnetic, force, resulting from the current 630 flowing through the coil 653.

F is the dynamic force exerted on the armature by the flowing stream.

B is the force exerted by the optional biasing force which may be used to improve meter performance under certain circumstances, as will subsequently be explained in more detail.

The magnitude of the solenoid force S is proportional to the coil current I, as indicated in the following electrical-mechanical interaction equation:

$$S \propto I(t) \tag{3}$$

Next, the dynamic force F exerted by the streamflow equals the reactive time-rate-of-decrease in the linear momentum of that portion of the flow stream which is incident, or in impact, with the armature 651, plus the viscous drag (friction) exerted on the armature by the flow stream, linear momentum being defined as the product of mass and velocity.

Thus, $$F = d/dt\, P + D \tag{4}$$

Both viscous drag D and $d/dt\, P$ are proportional to the stream flow velocity, from which it follows that F is itself proportional to the flow rate of the substance flowing through the transducer.

In accordance with the previous description, the armature reciprocates between two extreme, or limiting, positions, one an engaged position and the other a disengaged position.

Mathematically, A, (the net force acting on the armature, i.e. the magnetic force less stream force plus or minus the bias force, if any) must be non-negative when the armature is in the engaged position. In other words, $$A \geq 0 \tag{5}$$

when the armature is in the engaged position, and $$A < 0 \tag{6}$$

when the armature is not in the engaged position.

Examination of (5) and (6) shows that if the armature is in the engaged position, it will start to disengage when A changes from a positive to a negative quantity.

By equating (1) to 0 (i.e. A = 0), then, the solenoid force S, or magnetic force, on the armature 651 equals the stream force F plus or minus the optional bias force B, or, $$S = F \pm B \tag{7}$$

B is a known system quantity (e.g. the force of gravity in the case of the FIG. 1-1A form of device) and can be withdrawn as a constant, leaving S as proportional to F.

Thus, since the solenoid force S is also proportional to the current $I(t)$, pursuant to (3); and since F is proportional to the stream rate of flow, pursuant to (4), it can be deduced that the minimum transducer current $I(t)$ which is necessary to sustain armature engagement is proportional to the flow rate of the stream to be measured.

Similarly, the minimum solenoid current $I(t)$ necessary to initiate armature engagement, i.e. to urge the armature from the disengaged position toward the engaged position, is likewise proportional to the stream rate of flow.

The former measurement mode (i.e. measurement of the current necessary to sustain engagement) is ordinarily preferred since less current is required to sustain armature engagement than to initiate it; and lower armature magnetic flux densities can be utilized, thereby affording not only a more linear relationship between S and I, but also a greater range of instrument flow rates.

The transducer coil voltage $V(t)$, designated by the reference numeral 631, is given by the differential equation $$V(t) = IR + d/dt\,(LI) \tag{8}$$

where $I(t)$ is the coil current, L the coil inductance and R the series resistance of the transducer coil 653 plus the resistance of the cable carrying the leads 654 and 664 to the external circuit 600.

R is ordinarily substantially less than the equivalent internal resistances 641 and 644 of the circuit 600; and thus the IR term in (8) can be ignored.

Then, differentiating $V(t) = d/dt\,(LI)$ yields $$V(t) = L\, dI/dt + I\, dL/dt \tag{9}$$

From the electrical-mechanical interaction term $I\, dL/dt$, it follows that upon armature disengagement, a time-rate-of-decrease in coil inductance L occurs, with a corresponding negative time-rate-of-change in coil voltage $V(t)$, this negative voltage being discernible to the sense circuit 506 through transducer leads 554 and 564 and the bridging conductors 512 and 513, respectively. The sense circuit 506, in turn, provides the information concerning armature disengagement to the cycle regulation circuit 507 via the line 517 and to the transformation circuit 508 through the line 516.

The same analysis is applicable to the process of armature engagement.

As heretofore described, the transducer of the invention comprises a reciprocating solenoid whose frequency of oscillation (sampling rate) is regulated by the associated electronic circuit.

The cyclical operation is mathematically examined as follows:

If it be arbitrarily assumed that the cycle begins with the armature in the engaged position, then, as in equation (5), $A \geq 0$. That is to say, the net force A exerted on the armature (i.e. the solenoid force S, less the fluid flow force F plus or minus the known bias force B) is equal to or greater than 0.

The "control circuitry" thereupon reduces the coil current 630, thereby decreasing the coil's magnetic force, since $S \propto I$, as indicated in equation (3). When the net armature force A is no longer capable of maintaining armature engagement, i.e. when $A < 0$, as in equation (6), the static armature disengages from the initial, fully engaged position, and commences to move downstream with the stream flow. Then, as indicated in equation (9) this downstream movement of the armature causes a corresponding time-rate-of-change in coil voltage 631 which manifests the instant of armature disengagement, an event discerned by the sense circuit 506.

Infinitesimally before the instant of armature disengagement, equation (7) applies, and, as stated, the transducer's coil current is proportional to the stream flow rate.

The electronic circuit then increases the coil's magnetic force, as in equation (3), i.e. $S \propto I$. The solenoid coil current is at least near maximum. Since the net armature force A is positive, see equation (5), the armature 651 moves against the flow stream and reengages. Again, this event manifests itself by the resulting coil voltage transient, as in equation (9), and thereby completes the cycle which repeats.

In most installations, the stream flow will be either a commercial fluid or a dry powdered material, moving in a pipe or other conduit.

The axial flow velocity is usually variable, or fluctuating, depending on a number of well recognized factors, such as temperature, pressure, viscosity and demand. In order accurately to monitor flow rate on a realtime basis, the well known "Sampling Theorem" requires that the system's sampling rate be at least twice that of the highest frequency of the flow rate fluctuation.

The sampling rate is principally limited by the mechanical timeconstants associated with the flow meter's transducer and the substance flowing through it; also the capacitance of the cable (with leads 554 and 564) connecting the internal transducer to the system's external electronic circuit may relatively limit the sampling rate.

In general, a higher sampling rate can be realized in an embodiment of the invention by decreasing the transducer's inductance L (654). So also, a lower inductance L results in smaller coil voltage $V(t)$ transients upon either armature engagement or disengagement. While facilitating a higher sampling rate, however, a lower transducer inductance L decreases the system's sensitivity to armature motion.

It is to be recognized, however, that a dual-coil transducer may overcome this decrease in sensitivity, the principal coil being the solenoid coil 653 and the auxiliary coil being utilized exclusively for sensing armature motion. The auxiliary coil, not shown, herein, would be located in close proximity to the coil 653 and be of high inductance, i.e. has a greater number of turns than the primary coil 653. In this construction, the sensing circuit 506 is connected to the high impedance auxiliary sensing coil used to sense movement of the armature. With this arrangement, one terminal of the transducer coil 653 and the auxiliary coil could share a common terminal and thereby reduce the number of dual-coil terminals from four to three. By utilizing such an arrangement, the above-mentioned limitation, on, or dependence between, the sampling rate and the transducer coil inductance is obviated. Instead of an auxiliary coil, diametrically opposed capacitor plates, not shown, herein, can be placed on each side of coil 653; armature motion causing a change in capacitance and being sensed by resulting capacitive current transients which are synchronized to the armature's reciprocation.

Reference is now had to the transformation circuit 508 shown in FIG. 5. This circuit may be embodied both in meter and in alarm systems.

Figure 7:
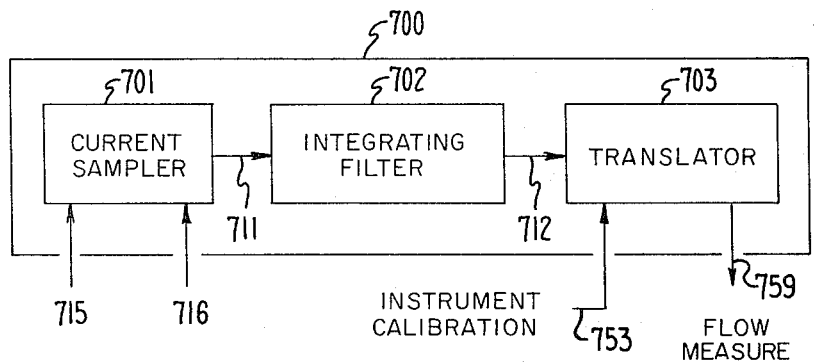
FIG. 7 is a metering block diagram of the transformation circuit in FIG. 5; and, FIG. 8 is an alarm block diagram of the transformation circuit in FIG. 5.
Figure 8:
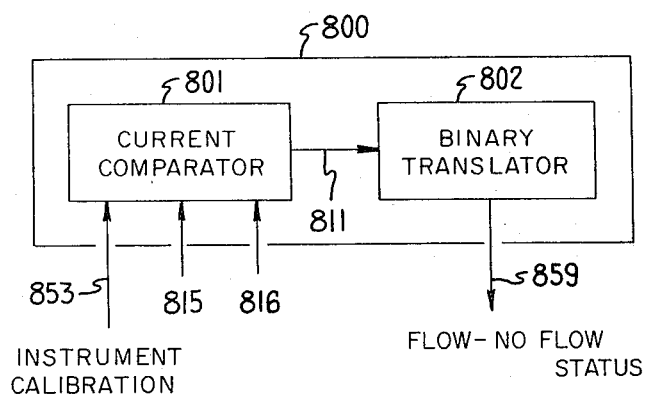

Reference numeral 700 in FIG. 7 represents a general meter (either analog or digital) type of embodiment of the transformation circuit, and numeral 800, in FIG. 8, discloses a general alarm (binary) embodiment thereof.

The following corresponding figure identifications relate to the description of these two circuit embodiments, 700 and 800. The instrument calibration inputs 753 and 853 of FIGS. 7 and 8, respectively, correspond to the instrument calibration input 553 of FIG. 5. In like manner, the flow measure output 759 and flow-no flow status 859 of respective FIGS. 7 and 8 correspond to the flow rate output 559 of FIG. 5. So also, the inputs 715, 716 of FIG. 7 and 815, 816 of FIG. 8 correspond to the internal inputs 515 (from node 522) and 516 to the transformation circuit 508 of the invention's electronic circuit 500.

As previously stated, the voltage input 515 is a real-time measure of the transducer's solenoid coil current and signal input 516 provides the transformation circuit 508 with the times of armature engagement/disengagement.

Reference is now had to FIG. 7, which discloses a metering embodiment, comprising a current sampler 701, integrating filter 702 and translator 703. The current sampler 701 and the integrating filter 702 together comprise a conventional "sample and hole" circuit. The current sampler circuit 701 receives two inputs, namely, an analog voltage measure of the solenoid coil current 715 and a digitized signal 716 designating the times of armature disengagement/engagement. The circuit 701 typically comprises a high input-low output impedance voltage follower circuit connected to a bipolar transistor or MOSFET switch controllable by the the digitized signal input 716.

Upon armature engagement/disengagement, the digitized signal input 716 causes this electronic switch to close momentarily, thus delivering the voltage 715 to the integrating filter 702 via the input line 711.

In accordance with the foregoing disclosure, the voltage 715 is proportional to the flow rate at the times of switch closure.

The integrating filter circuit 702 typically comprises a capacitor-holding-circuit followed by a high input-low output impedance voltage follower circuit connected to a low-pass filter. Thus, the integrating filter circuit 702 serves to transform the output voltage pulses from the current sampler 701 into a smooth analog voltage which is proportional to the voltage level of these pulses.

The low-pass filter output is delivered by the line 712 to a translator circuit 703 which converts the signal to an appropriate flow measure read-out 759. The meter output 759 may be in digital form by designing a suitable analog-to-digital (A/D) converter into the translator network 703.

The translator 703 also serves to compensate for system non-linearities as well as provide the appropriate scale for the flow measure read-out, using conventional design techniques. Parameters to be considered include transducer orifice size relative to the cross-sectional area of the flow stream; number of turns in the transducer's solenoid coil; magnetic permeability of the transducer armature; dimensions and configurations of the transducer armature and housing; flow stream density; and flow stream drag on the armature, a function of armature surface roughness and flow stream viscosity, which, in turn, is dependent on temperature.

As will be obvious, linearity of the system parameters is of much more importance in a meter embodiment 700 of the flow meter, as just described, than in an alarm embodiment 800, now to be described.

The alarm embodiment 800 shown in FIG. 8 comprises a current comparator 901 and a binary translator 802.

The current comparator 801 receives three inputs, namely, an analog voltage measure of the transducer coil current 815 (from node 522), a digitized signal 816 from the sense circuit 506 designating the times of armature engagement/disengagement, and an optional voltage calibration input 853.

The current comparator circuit 801 typically comprises a high input impedance differential comparator circuit of which one input is the analog voltage 815 and the other is either the DC calibration voltage 853 or some other suitable internal DC reference voltage corresponding to a predetermined threshold flow rate.

The bilevel output of the differential comparator within the network 801 is coupled to one input of a suitable two input flip-flop, the other input of the flip-flop being the digitized signal 816.

In operation, when the analog voltage 815 is greater than the reference voltage 853, the output of the comparator is a logical-one. Upon armature engagement/disengagement, the digitized signal 816 is momentarily a logical-one, and at that moment, the analog voltage 815 is proportional to the flow rate of the device. Provided the differential comparator output is a logical-one when the digitized signal 816 is a logical-one, the flip-flop output is set to a logical-one, representing a flow rate greater than the predetermined rate to which it is referenced, i.e. the voltage 853. Otherwise, the sole input logical-one signal 816 resets the flip-flop to a logical-zero output, which corresponds to a flow rate less than the predetermined rate to which it is referenced.

The flip-flop output is delivered via input line 811 to the binary translator 802 which converts the logical-one (i.e. flow) and the logical zero (i.e. no-flow) into an appropriate read-out 859 to indicate flow status.

In most flow monitoring devices, it is customary to designate the no-flow (logical-zero) as an "alarm" condition. As will be recognized, the flow-no flow output can be delivered to an associated alarm unit to provide a warning alert when flow has dropped below a predetermined flow rate.

As previously indicated, the transducer element is susceptible of numerous physical embodiments in addition to the gravity biased unidirectional type disclosed in FIGS. 1 and 1A.

For example, the structure 200 shown in FIGS. 2 and 2A is also of the unidirectional category but with the armature bias force provided by an auxiliary coil 205 connected by conductors 206 to a suitable AC/DC source capable of causing a known augmenting magnetic force on the armature at least at appropriate intervals in tuned sequence with the reciprocation cycle of the armature 201. As before, the transducer housing 202, is elongated and aligned with the flow stream 220-221 and the solenoid coil 203 is connected by conductors 204 to the appropriate circuitry of FIG. 5. The housing is internally provided with a plurality of longitudinal ribs 211, or lands, terminated with forward shoulders 209 and after shoulders 210 to guide and limit the extent of movement of a solid ferromagnetic armature 201 translatably disposed within the elongated axial chamber 216. The stream enters the intake orifice 207, passes through the grooved chamber 216 and emerges through the outlet orifice 208. As before, when the armature is in forwardmost engaged position, as determined by the placement of the forward shoulders 209, a state of maximum flux is realizable; and when the armature is in aftermost position, abutting the shoulders 210, minimum flux is realized by the solenoid coil.

The transducer embodiment 300 shown in FIGS. 3 and 3A is again of the unidirectional type, with the biasing force against the hollow armature 301 being exerted by a suitable spring 305 interposed between the after end of the armature 301 and an internal flange 310 adjacent the outlet orifice 308 of the elongated housing 302. Maximum flux is realizable when the armature, forced in opposition to flow stream 320, 321 by solenoid coil 303, 304 embedded in the housing, comes into abutment with a forward limit stop 309 near the intake orifice 307.

Still another embodiment 400 is illustrated in FIGS. 4 and 4A wherein a streamlined housing 402 is not only radially symmetrical but is also substantially symmetrical about a median transverse plane 430, this embodiment being a bidirectional form of transducer.

A symmetrically disposed solenoid coil 403, 404 embedded in the housing exerts a force on an armature 401 of spherical configuration constrained to reciprocate to and fro in an elongated central chamber 416 defined by a plurality of longitudinal lands 411 disposed and grooves 418 formed within the housing 402. Shoulders 409 and 410 on the opposite ends of the lands 411 and proximate to orifices 407 and 408 respectively define the limiting extent of the excursions of the ball-shaped armature 401 on each side of the transverse median plane 430 under the influence of the flow stream 420-421. Maximum flux is realizable when the armature 401 coincides with the median transverse plane 430. It will be noted that the stream flow can be bidirectional. Thus, the FIGS. 4 and 4A form of device operates with the flow stream 420-421 in either direction. If the flow stream is from orifice 407 to orifice 408, reciprocating armature motion occurs on the right side of median transverse plane 430 and vice-versa. Auxiliary inductive detectors (not shown) can be utilized to determine flow stream direction; for example, a small coil of wire can be placed around the armature on each side of the coil 403 such that armature displacement proximate to a coil will cause a change in that coil's inductance. Somewhat similarly, diametrically opposed capacitor plates (not shown) can be placed on each side of coil 403; the movement of the armature between the plates causing a change in capacitance.

The biasing force provided by the gravity bias of the FIGS. 1–1A form of device and the spring urgency of the FIGS. 3–3A embodiment are opposite in the sense that the force of gravity in the transducer 100 augments the downward direction of the flow stream 120 force whereas in the spring-biased transducer 300, the spring force opposes the flow stream 320 force. It is of course recognized that these directions can, if desired, be reversed, depending upon the system parameters; this also being applicable to transducer 200 of FIGS. 2–2A.

The armature bias force capability enhances the accuracy of performance by affording greater linearity. It also serves to extend the range of accurate measurement. The optional armature bias force is represented mathematically by the symbol B in the equations presented above. When the flow meter of the invention is used on flow streams having very low flow rates, a coincident, or augmenting armature bias force is used to facilitate proper functioning of the device. When used on flow streams with high flow rates, an opposing armature bias force, i. e. one having a subtractive effect, can be used to enhance flow meter linearity and desirably extend the range of accurate measurement. Reference is had to the equations heretofore presented to show the consequences of introducing the armature bias force B.

It is also to be noted, at this point, that the transducer components, particularly the armature and coils, are preferably coated with protective films, such as "plastics," or ceramics, and the like, to minimize corrosion, beneficially alter the coefficient of friction of the armature and improve the characteristics of abutting surfaces.

It can therefore be seen that I have provided a durable and reliable flow meter which is not only relatively economical but also versatile in that it is capable of being used in a wide number of environments.

I claim:

1. A flow meter comprising:
   a solenoidal transducer for installation in a conduit in which flow occurs in a predetermined direction from upstream to downstream, said transducer including a substantially non-magnetic housing defining an elongated chamber, at least a proportionate amount of said flow being through said chamber, a magnetically responsive armature disposed in said chamber for reciprocating movement in line with the chamber flow, dynamic forces being exerted on said armature as a result of its interaction with said chamber flow, said chamber including mechanical means to limit armature movement in at least the downstream direction, inductive coil means disposed adjacent said chamber and including said armature in the magnetic circuit thereof for applying a force thereon effective to urge said armature in the direction opposite of said chamber flow, armature movement causing a parametric change in said coil means;
   means electrically coupled to said coil means for alternately energizing and de-energizing said transducer, thereby producing reciprocation of said armature;
   measurement means electrically coupled to said coil means for providing a signal proportional to the currents thereof, and,
   sensing means for providing a signal manifesting said parametric changes; and
   computing means responsive to said coil current and parametric change signals wherefrom the rate of flow in said conduit is obtained.

2. The apparatus according to claim 1 further comprising means for establishing a bias force on said armature having a predetermined direction in line with said chamber flow to enhance the operational range of said apparatus.

3. The apparatus according to claim 2 wherein said armature bias force is due to a magnetic field.

4. The apparatus according to claim 2 wherein said armature bias force is due to an elastic mechanical means.

5. The apparatus according to claim 1 wherein said chamber further includes mechanical means to limit armature movement in the upstream direction.

6. The apparatus according to claim 5 in which said transducer is substantially symmetrical about a median plane transverse to said chamber flow, whereby said flow in said conduit may be in either direction.

7. The apparatus according to claim 1 wherein:
   the means for energizing said transducer, comprises;

a transistor in series with a DC voltage source, and, a co-active diode in shunt with said coil means for de-energizing said transducer; and,
   control means producing a source of pulses connected to the base of said transistor, causing it to switch in synchronism with the reciprocation of said armature.

8. The apparatus according to claim 1 wherein said measurement means comprises a resistor in series with said coil means.

9. The apparatus according to claim 1 wherein said sensing means comprises circuitry bridging said coil means.

10. The apparatus according to claim 1 wherein the means for computing the rate of flow in said conduit, comprises:
    a sampling circuit for obtaining a measure of said coil current signals upon the prescribed starts of armature movement;
    means for filtering the pulsed output of said sampling circuit, thereby developing a smooth signal which is proportional to the amplitude thereof, and,
    means for converting the conditioned signal from the filtering means into a suitable output form, the output being a measure of the rate of flow in said conduit.

11. The apparatus according to claim 1 wherein the means for computing the rate of flow in said conduit, comprises:
    a comparator circuit which compares said coil current signals with a DC reference signal upon the prescribed starts of armature motion, the output thereof being a bilevel signal; and,
    means for converting the bilevel signal from said comparator circuit into a suitable output form, the output being a binary-measure of the rate of flow in said conduit.

* * * * *